(12) United States Patent
Maij et al.

(10) Patent No.: US 12,065,333 B2
(45) Date of Patent: Aug. 20, 2024

(54) CLAMP FOR WIND TURBINE ROTOR BLADE

(71) Applicant: LiftWerx Holdings Inc., Cambridge (CA)

(72) Inventors: Eelko Maij, Wateringen (NL); André Van Der Steen, Maarssen (NL); Glen D. Aitken, Fergus (CA)

(73) Assignee: LiftWerx Holdings Inc., Cambridge (CA)

( * ) Notice: Subject to any disclaimer, the term of this patent is extended or adjusted under 35 U.S.C. 154(b) by 361 days.

(21) Appl. No.: 17/630,964

(22) PCT Filed: Jul. 29, 2020

(86) PCT No.: PCT/CA2020/051035
§ 371 (c)(1),
(2) Date: Jan. 28, 2022

(87) PCT Pub. No.: WO2021/022361
PCT Pub. Date: Feb. 11, 2021

(65) Prior Publication Data
US 2022/0267119 A1  Aug. 25, 2022

Related U.S. Application Data

(60) Provisional application No. 62/882,298, filed on Aug. 2, 2019.

(51) Int. Cl.
*F03D 13/00* (2016.01)
*B66C 1/10* (2006.01)
*B66C 1/62* (2006.01)

(52) U.S. Cl.
CPC .............. *B66C 1/108* (2013.01); *B66C 1/62* (2013.01); *F03D 13/00* (2016.05); *F05B 2230/61* (2013.01)

(58) Field of Classification Search
CPC . B66C 1/108; B66C 1/62; F03D 13/00; F05B 2230/61
See application file for complete search history.

(56) References Cited

U.S. PATENT DOCUMENTS 9,321,613 B2 * 4/2016 Hansen ................... F03D 13/40
9,638,163 B2    5/2017 Holloway et al.
(Continued)

FOREIGN PATENT DOCUMENTS

CN    103723614 A    4/2014
DK    201400575 A1   4/2016
(Continued)

OTHER PUBLICATIONS

International Search Report and Written Opinion dated Oct. 30, 2020 on PCT/CA2020/051035.
(Continued)

*Primary Examiner* — Nirvana Deonauth
(74) *Attorney, Agent, or Firm* — Brunet & Co. Ltd.; Robert Brunet; Hans Koenig

(57) ABSTRACT

A rotor blade clamp is provided for assisting with mounting and/or dismounting of a rotor blade. The clamp has a first clamping part and a second clamping part opposed to the first clamping part. A spring-loaded hinge connects the first clamping part to the second clamping part, and has at least one spring that biases the clamping parts apart to an opened clamp configuration. The clamp has a reeving mechanism with a first reeving portion on the first clamping part and a second reeving portion on the second clamping part. The first and second reeving portions are adapted to receive a line therebetween, whereby pulling a free portion of the line reeved through the reeving portions draws the clamping parts together to a closed clamp configuration against the bias of the at least one spring.

11 Claims, 16 Drawing Sheets

(56) References Cited

U.S. PATENT DOCUMENTS

| | | |
|---|---|---|
| 9,897,068 B2 | 2/2018 | Bendel |
| 2015/0028610 A1 | 1/2015 | Hansen et al. |
| 2017/0045029 A1 | 2/2017 | Senthoorpandian et al. |
| 2017/0218927 A1* | 8/2017 | Holloway ............... F03D 80/50 |
| 2018/0044141 A1 | 2/2018 | Hansen et al. |

FOREIGN PATENT DOCUMENTS

| | | |
|---|---|---|
| EP | 2873641 B1 | 2/2017 |
| EP | 3150544 A1 | 4/2017 |
| WO | 2012095112 A1 | 7/2012 |
| WO | 2018/054440 A1 | 3/2018 |
| WO | 2020/053391 A1 | 3/2020 |

OTHER PUBLICATIONS

Extended European Search Report dated Jun. 30, 2023 on EP 20849430.2.

* cited by examiner

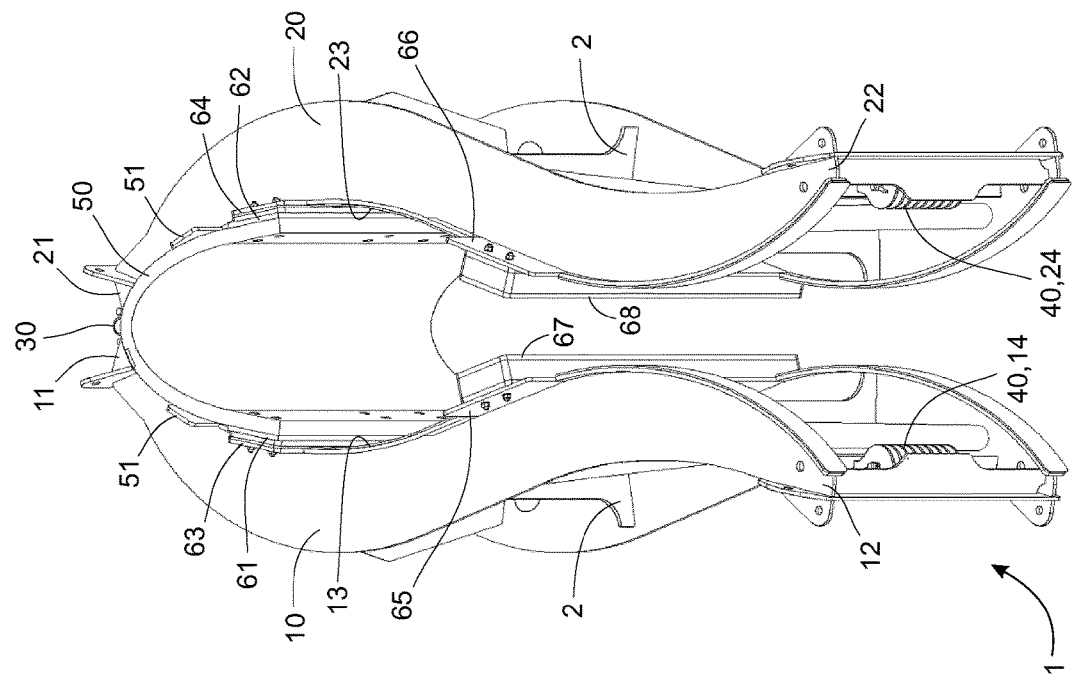
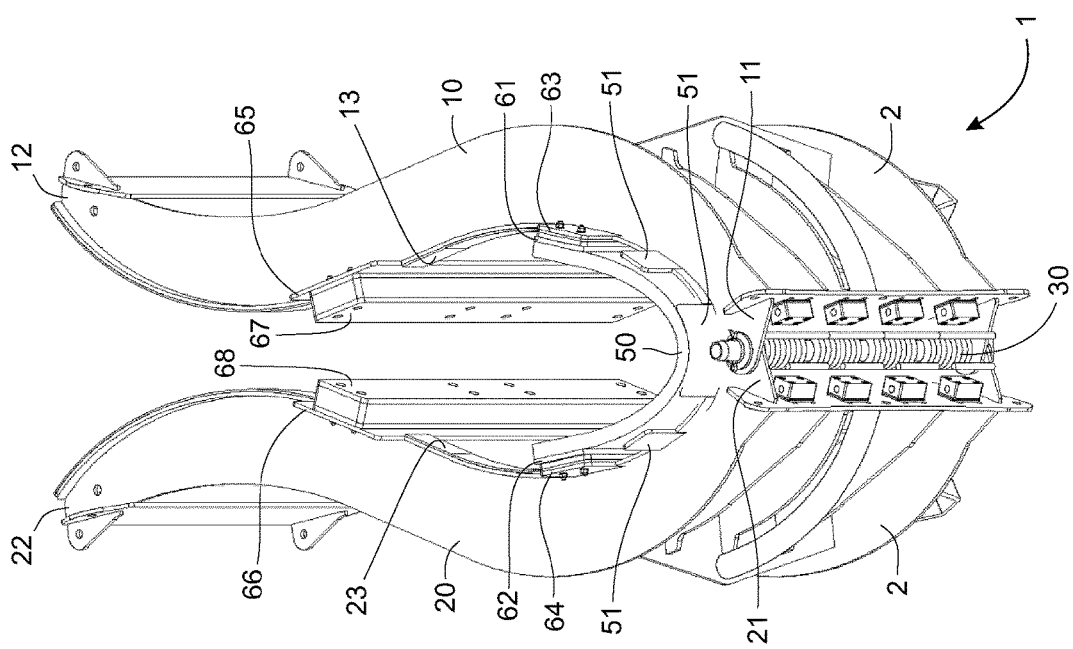

CLAMP FOR WIND TURBINE ROTOR BLADE

CROSS-REFERENCE TO RELATED APPLICATIONS

This application is a national entry of PCT/CA2020/051035 filed July 29. 2020, which claims the benefit of United States Provisional Application U.S. Ser. No. 62/882,298 filed Aug. 2, 2019, the entire contents of both of which are herein incorporated by reference.

FIELD

This application relates to wind turbines, in particular to clamps for clamping a single rotor blade of a wind turbine to assist with mounting and/or dismounting of the rotor blade on a rotor hub of the wind turbine.

BACKGROUND

Methods and devices for mounting and dismounting rotor blades on a rotor hub of a wind turbine are known in the art. Such devices include variously designed sleeves, yokes, carriages and the like that are affixed to or otherwise engage with the rotor blade. However, despite the number of devices that have been developed, there remains a need for a device to assist with mounting and/or dismounting of a rotor blade on a rotor hub, which is one or more of simple to operate, reliable, compact and adaptable to different rotor blades.

SUMMARY

In one aspect, there is provided a rotor blade clamp for assisting with mounting and/or dismounting of a rotor blade on a rotor hub of a wind turbine, the rotor blade clamp comprising: a first clamping part having a first inner face contoured to accommodate a shape of the rotor blade at a designated clamping location on the rotor blade; a second clamping part opposed to the first clamping part, the second clamping part having a second inner face opposed to the first inner face and contoured to accommodate the shape of the rotor blade at the designated clamping location on the rotor blade; a spring-loaded hinge connecting the first clamping part to the second clamping part, the spring-loaded hinge comprising at least one spring that biases the clamping parts apart to an opened clamp configuration; a reeving mechanism comprising a first reeving portion on the first clamping part and a second reeving portion on the second clamping part, the first and second reeving portions adapted to receive a line therebetween, whereby pulling a free portion of the line reeved through the reeving portions draws the clamping parts together to a closed clamp configuration against the bias of the at least one spring.

In another aspect, there is provided a method of mounting or dismounting of a rotor blade of a wind turbine, the method comprising: providing a rotor blade clamp as defined above; installing rigging on the clamp and suspending the clamp from a top of the wind turbine at a position where the clamp can receive the rotor blade between the clamping parts of the clamp; pre-tensioning the reeving mechanism with the line reeved therethrough until a distance between distal ends of the clamping parts is a predetermined distance based on geometry of the rotor blade; moving the clamp over a tip of the rotor blade so that the tip of the rotor blade is between the clamping parts of the clamp, and further moving the clamp along the rotor blade with the rotor blade between the clamping parts until the clamp reaches the designated clamping location; operating the reeving mechanism to close the clamp on the rotor blade at the designated clamping location to secure the rotor blade in the clamp; and, raising or lowering the rotor blade using the rigging installed on the clamp or separate rigging installed on the rotor blade.

The first clamping part preferably comprises a first shim mount for removably mounting a first shim on the first inner face of the first clamping part. The first shim preferably comprises a first geometry depending on a type of the rotor blade being mounted or dismounted. The second clamping part preferably comprises a second shim mount for removably mounting a second shim on the second inner face of the second clamping part. The second shim preferably comprises a second geometry depending on the type of the rotor blade being mounted or dismounted.

The spring-loaded hinge preferably connects a proximal end of the first clamping part to a proximal end of the second clamping part. The hinge preferably provides a common rotation axis about which the clamping parts rotate when the spring biases the clamping parts to open or when the pulling of the line causes the clamp to close. The at least one spring preferably comprises at least one coiled torsion spring. The hinge preferably further comprises a hinge pin disposed within the coil of the at least one coiled torsion spring. The at least one coiled torsion spring preferably comprises a plurality of coiled torsion springs. The hinge pin is preferably disposed within the coils of all of the coiled torsion springs.

The first reeving portion is preferably situated proximate a distal end of the first clamping part. The second reeving portion is preferably situated proximate a distal end of the second clamping part. The first reeving portion preferably comprises a first block of pulley elements. The second reeving portion preferably comprises a second block of pulley elements. The blocks of pulley elements are preferably mounted on the inner faces of the respective clamping parts. The reeving mechanism preferably comprises a one-way lock for preventing movement of the line in the reeving portions to prevent opening of the clamp. The one-way lock preferably comprises a single progress capture pulley through which the line is reeved.

The blade clamp is preferably clamped to the rotor blade at a location on the rotor blade where no secondary blade components are installed, for example dino shells, dino tails, gurney flaps and vortex generators. The blade clamp is preferably clamped to the rotor blade at a location on the rotor blade where tag line forces can be minimized during raising and lowering of the rotor blade. For a number of rotor blade types, this location may be about 35 m from the root of the rotor blade.

The rotor blade clamp is advantageously simple to operate, reliable, compact and adaptable to different rotor blades.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 2 depicts the rotor blade clamp of FIG. 1 from the top and front;

FIG. 3 depicts the rotor blade clamp of FIG. 1 from the top and rear;

DETAILED DESCRIPTION

Figure 11:
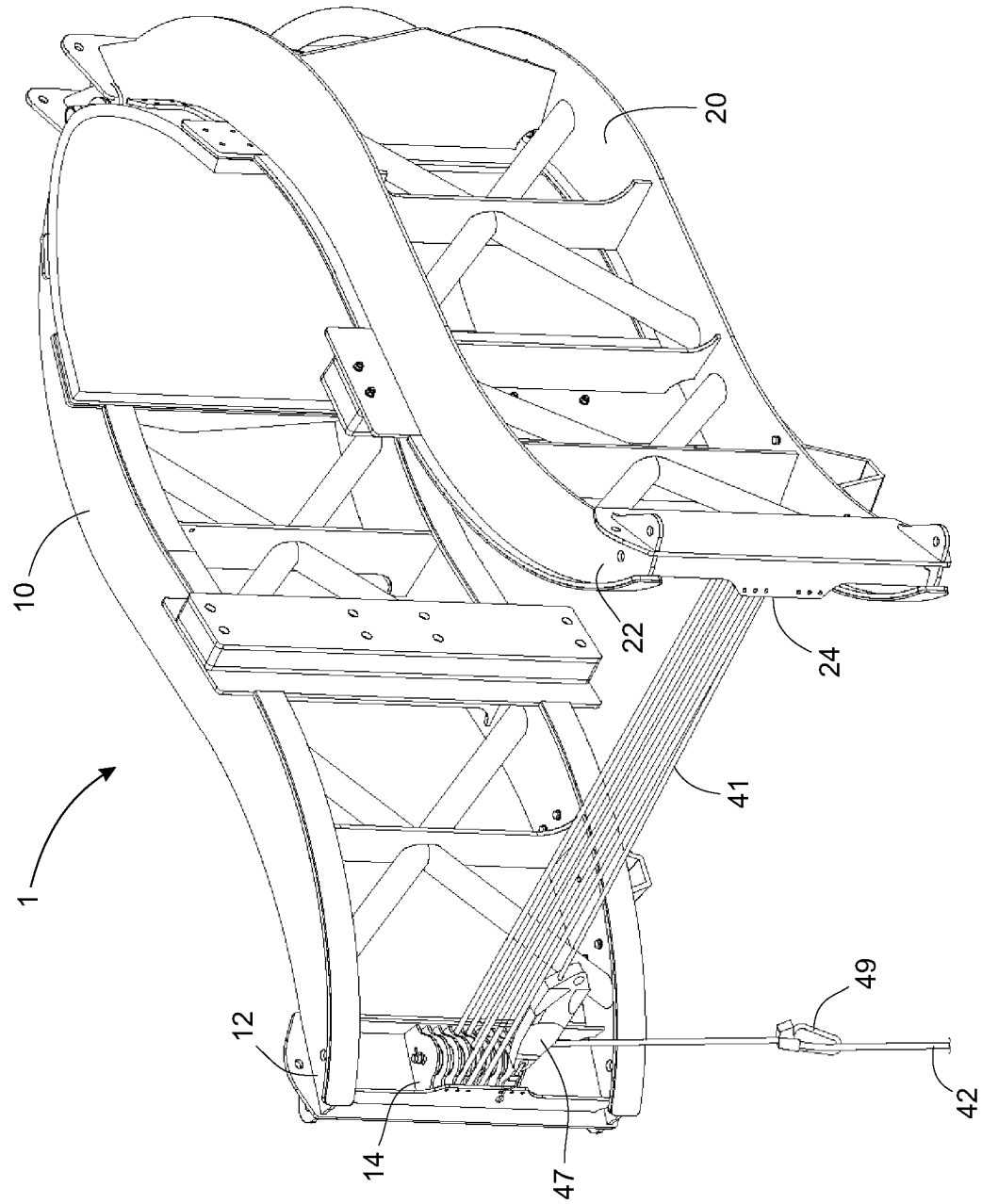
FIG. 11 depicts a top rear perspective view of the rotor blade clamp of FIG. 1 including a line reeved through a reeving mechanism for operating clamping parts of the clamp.
Figure 12:
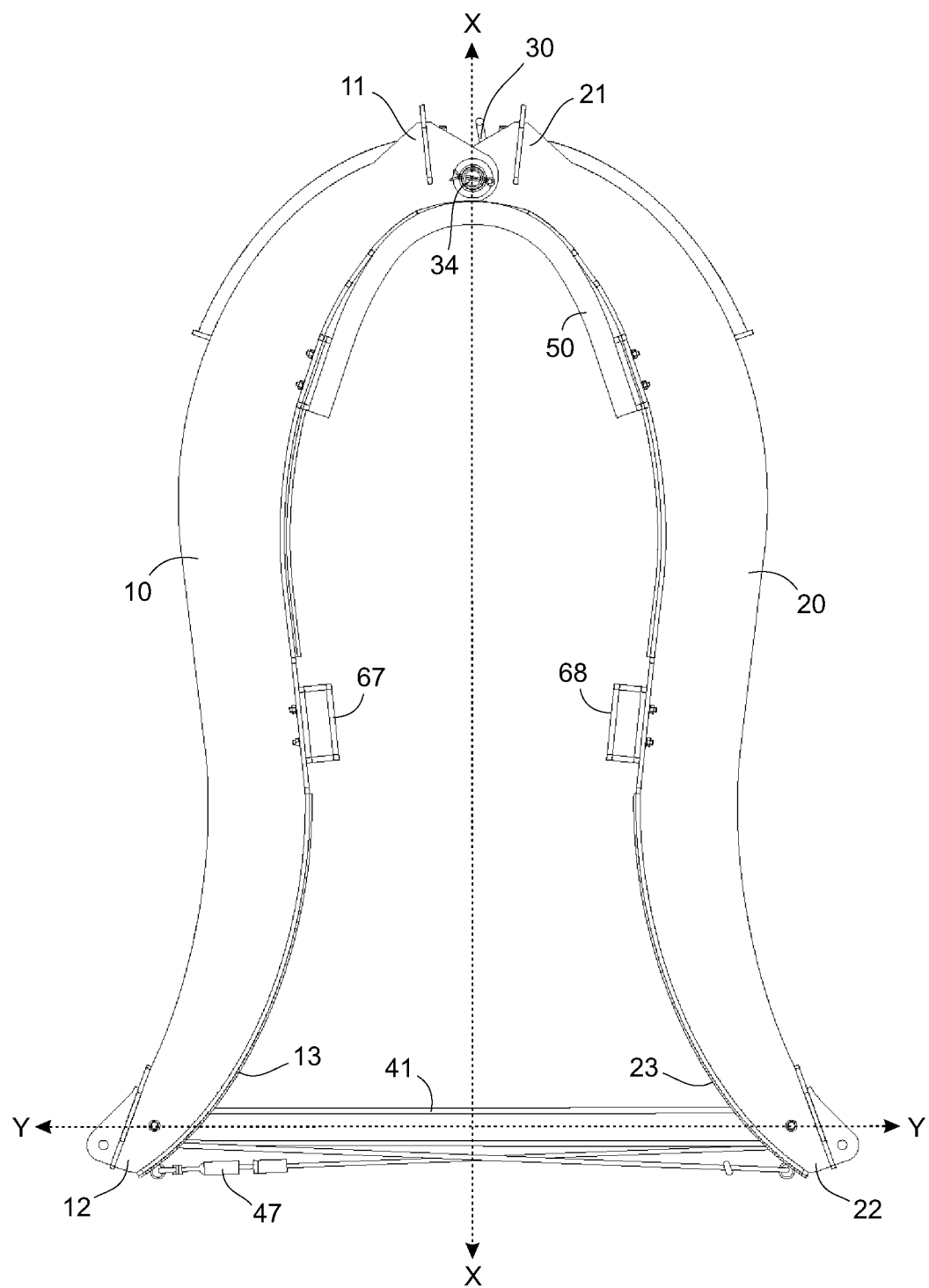
FIG. 12 depicts a top view of the rotor blade clamp depicted in FIG. 11.
Figure 13:
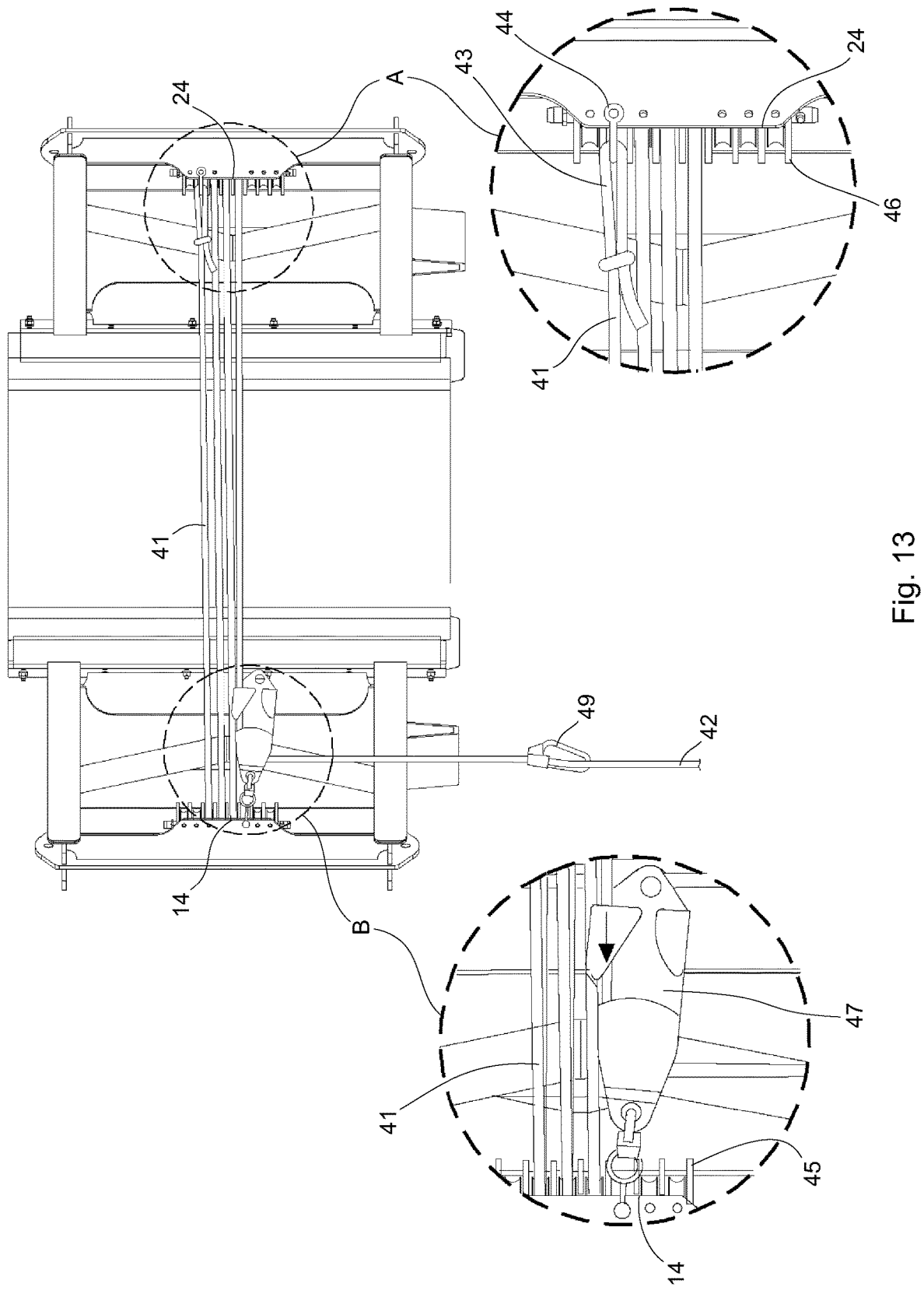
FIG. 13 depicts a rear view of the rotor blade clamp of FIG. 11 together with regions A and B in FIG. 13 magnified by 5×.

With reference to the Figures, in one embodiment, a rotor blade clamp 1 comprises a clamp frame 2 defined by a first clamping part 10 pivotally linked to and opposed to a second clamping part 20. The first clamping part 10 has a proximal end 11, a distal end 12 and an inner face 13. The second clamping part 20 has a proximal end 21, a distal end 22 and an inner face 23. The proximal ends 11, 21 of the first and second clamping parts 10, 20, respectively, are pivotally linked together at a spring-loaded hinge 30, the hinge 30 biasing apart the opposed inner faces 13, 23 of the clamping parts 10, 20, respectively, toward an open clamp configuration. The open configuration is illustrated in FIG. 11, FIG. 12 and FIG. 13. The rotor blade clamp 1 further comprises a reeving mechanism 40 comprising a first reeving portion 14 and a second reeving portion 24. The first reeving portion 14 is mounted on the inner face 13 proximate the distal end 12 of the first clamping part 10. The second reeving portion 24 is opposed to the first reeving portion 14, and is mounted on the inner face 23 proximate the distal end 22 of the second clamping part 20. A reeving line 41 is reeved through the reeving mechanism 40 between first reeving portion 14 and the second reeving portion 24. Pulling on a free portion 42 of the reeving line 41 draws the clamping parts 10, 20 together to a closed clamp configuration against the bias of the hinge 30. The closed configuration is illustrated in FIG. 1 to FIG. 8.

The inner faces 13, 23 of the first and second clamping parts 10, 20, respectively, are contoured to accommodate a shape of a rotor blade 80 at a designated clamping location on the rotor blade 80. The two inner faces may be contoured in any suitable manner, and may be symmetrical or asymmetrical with respect to each other. In the rotor blade clamp 1, the inner faces 13, 23 provide the clamp frame 2 with a symmetrical "omega-shaped" inner contour within which the rotor blade 80 may be clamped. When clamped, the rotor blade 80 occupies a proximally situated "teardrop-shaped" portion of the inner contour, while the distal ends 12, 22 flare outwardly from each other to provide space for operation of the reeving line 41.

To further accommodate the shape of a rotor blade 80 and provide a non-damaging surface on which the rotor blade 80 may slide when being inserted into the clamp 1 and may be seated when clamped in the clamp 1, the rotor blade clamp 1 is provided with a resilient sliding slab 50 mounted on the inner faces 13, 23 of the first and second clamping parts 10, 20. The resilient sliding slab 50 preferably bridges the hinge 30 where the first and second clamping parts 10, 20 are pivotally mounted to protect both the rotor blade 80 and the hinge 30 from damage when the rotor blade 80 is being clamped. The resilient sliding slab 50 is preferably a single piece of resilient material, for example elastomeric foam, which forms to the inner contour of the clamp frame 2. The resilient sliding slab 50 may be mounted to the clamp frame 2, for example with bolts, adhesives, clips, etc., at one or more slab mounts 51, which are plates mounted on the inner faces 13, 23 of the first and second clamping parts 10, 20.

Figure 14:
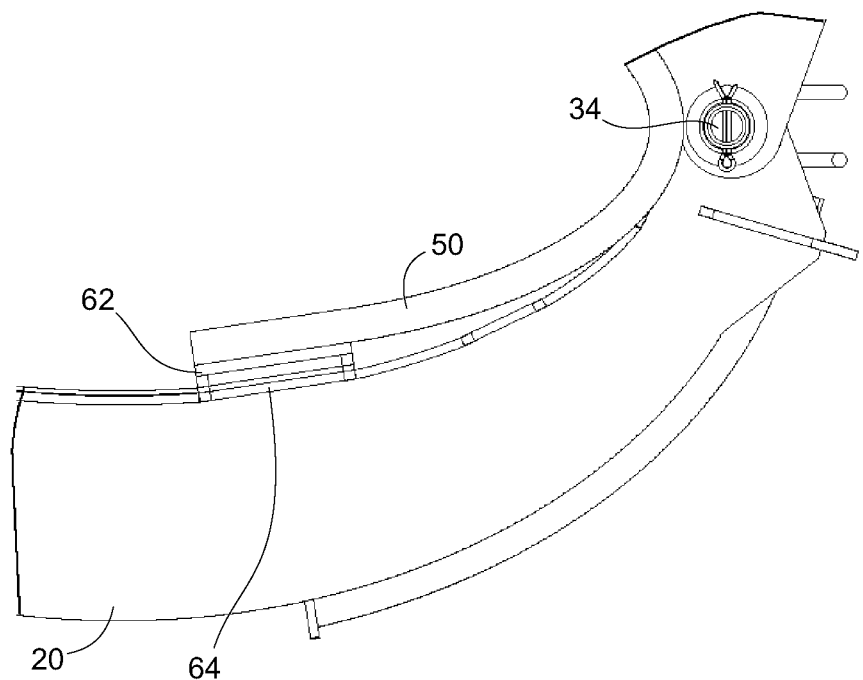
FIG. 14 depicts a top view of one clamping part of the rotor blade clamp of FIG. 1 shown with a 5 mm shim.
Figure 15:
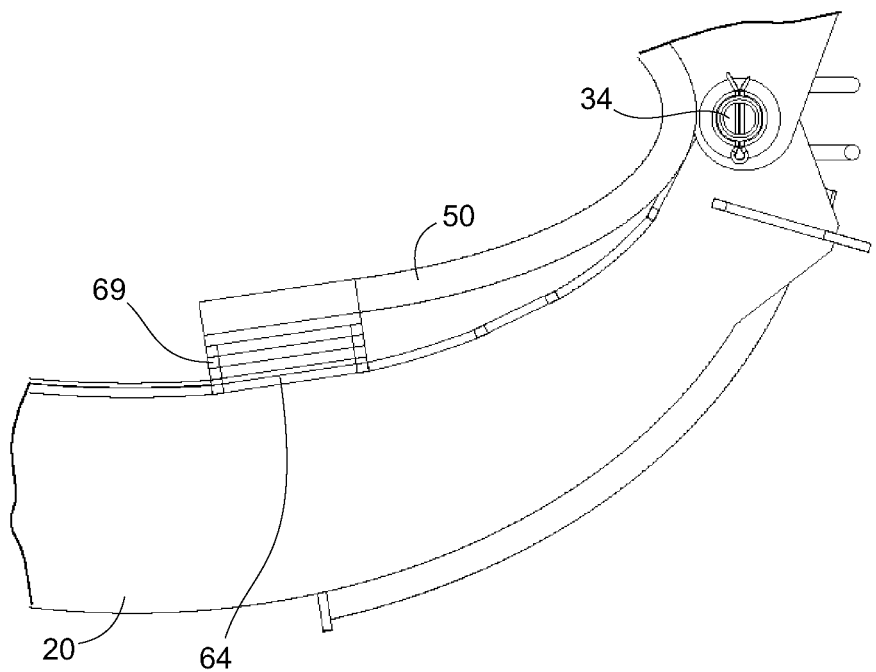
FIG. 15 depicts a top view of one clamping part of the rotor blade clamp of FIG. 1 shown with a 35 mm shim.
Figure 16:
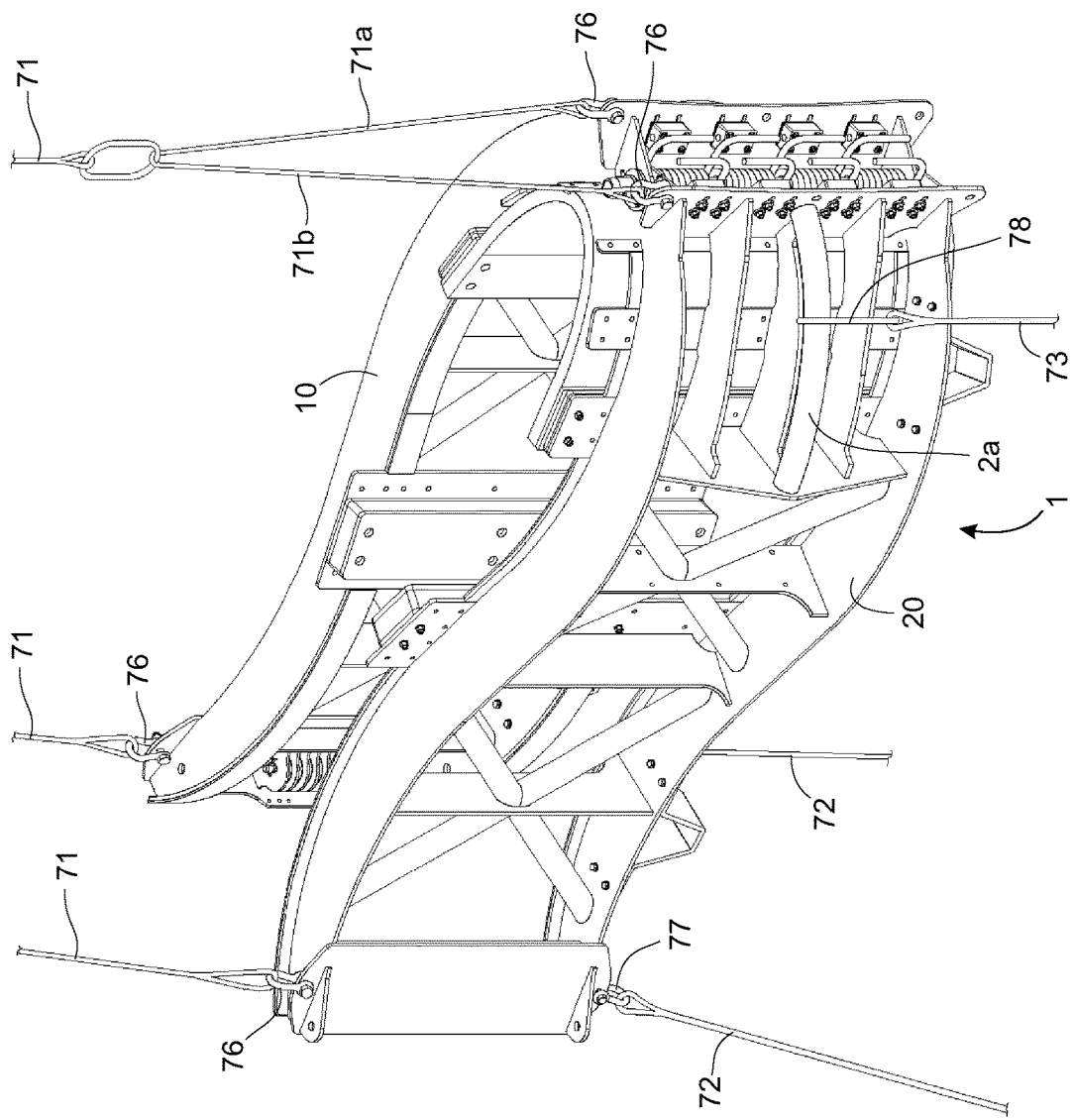
FIG. 16 depicts a top front perspective view of the rotor blade clamp of FIG. 1 including rigging.
Figure 17:
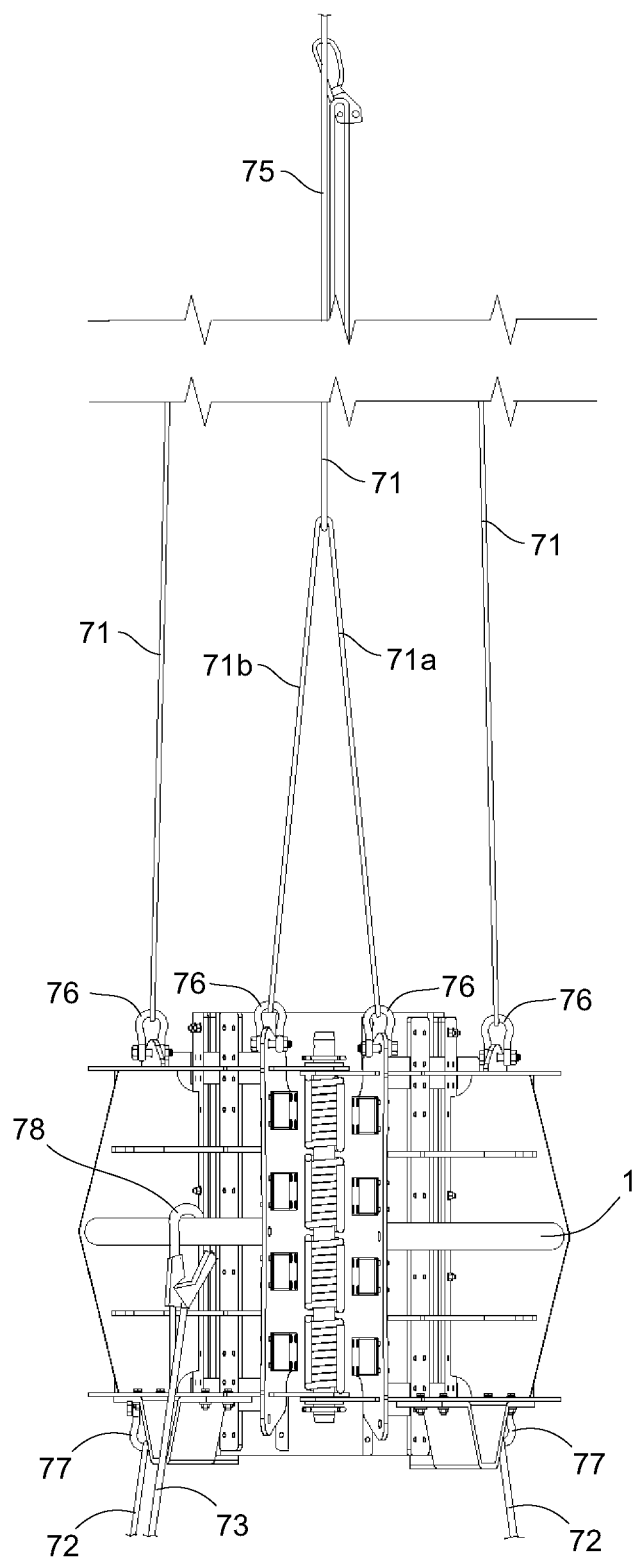
FIG. 17 depicts a front view of the rotor blade clamp of FIG. 16.
Figure 18:
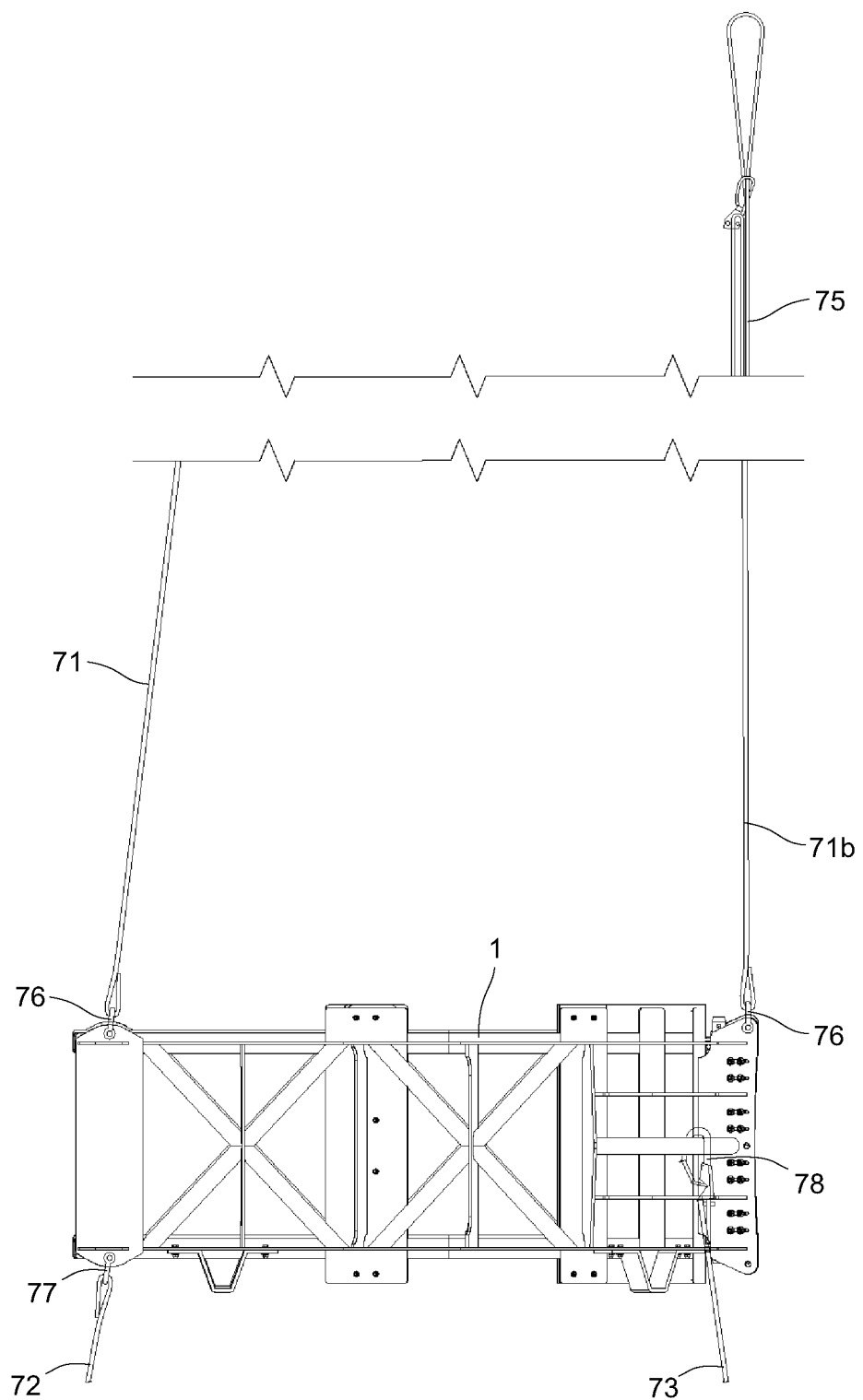
FIG. 18 depicts a side view of the rotor blade clamp of FIG. 16.
Figure 19:
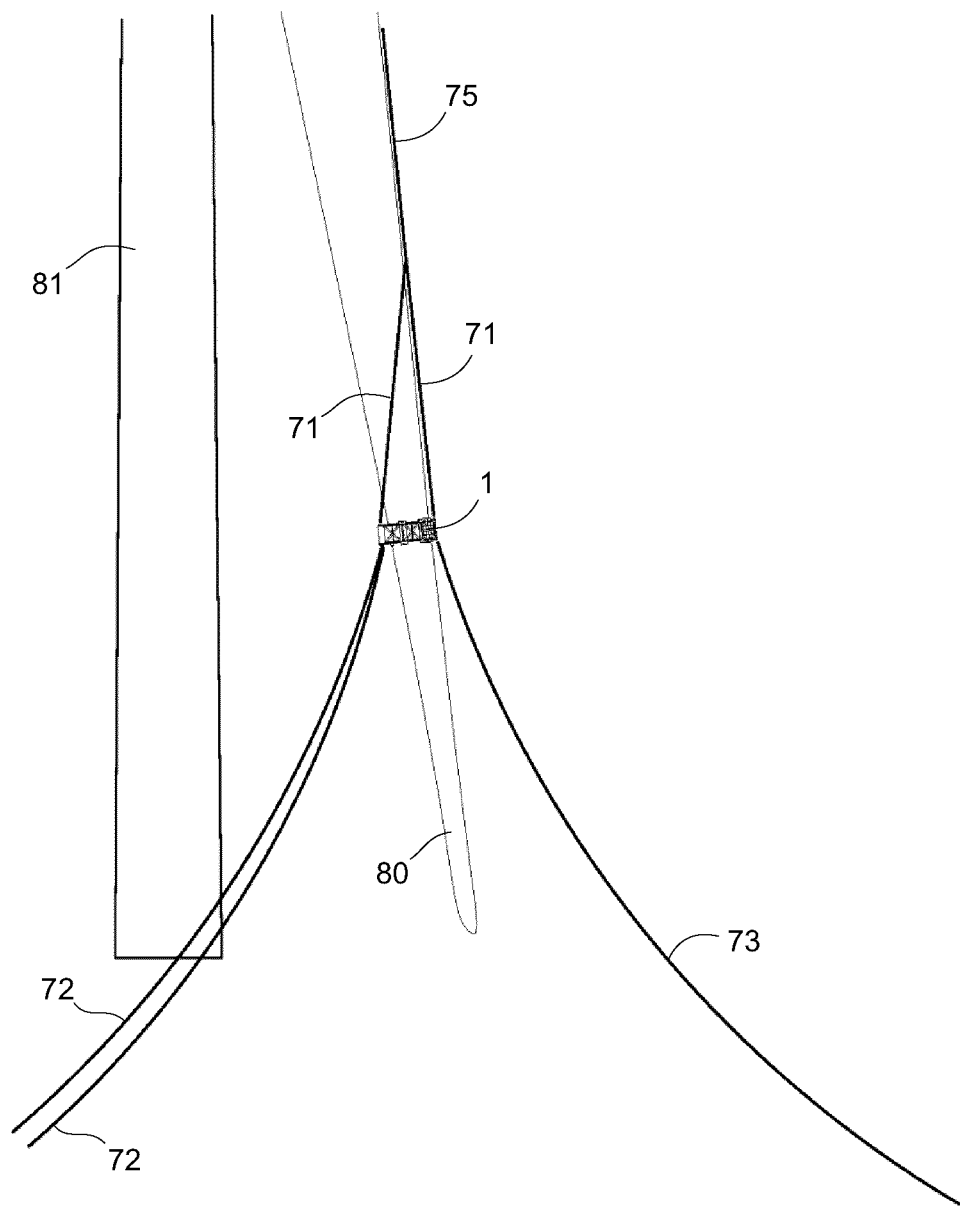
FIG. 19 depicts an overview of the rigging shown in FIG. 16 in context of a tower and a rotor blade of the wind turbine during a rotor blade mounting/dismounting operation.
Figure 20:
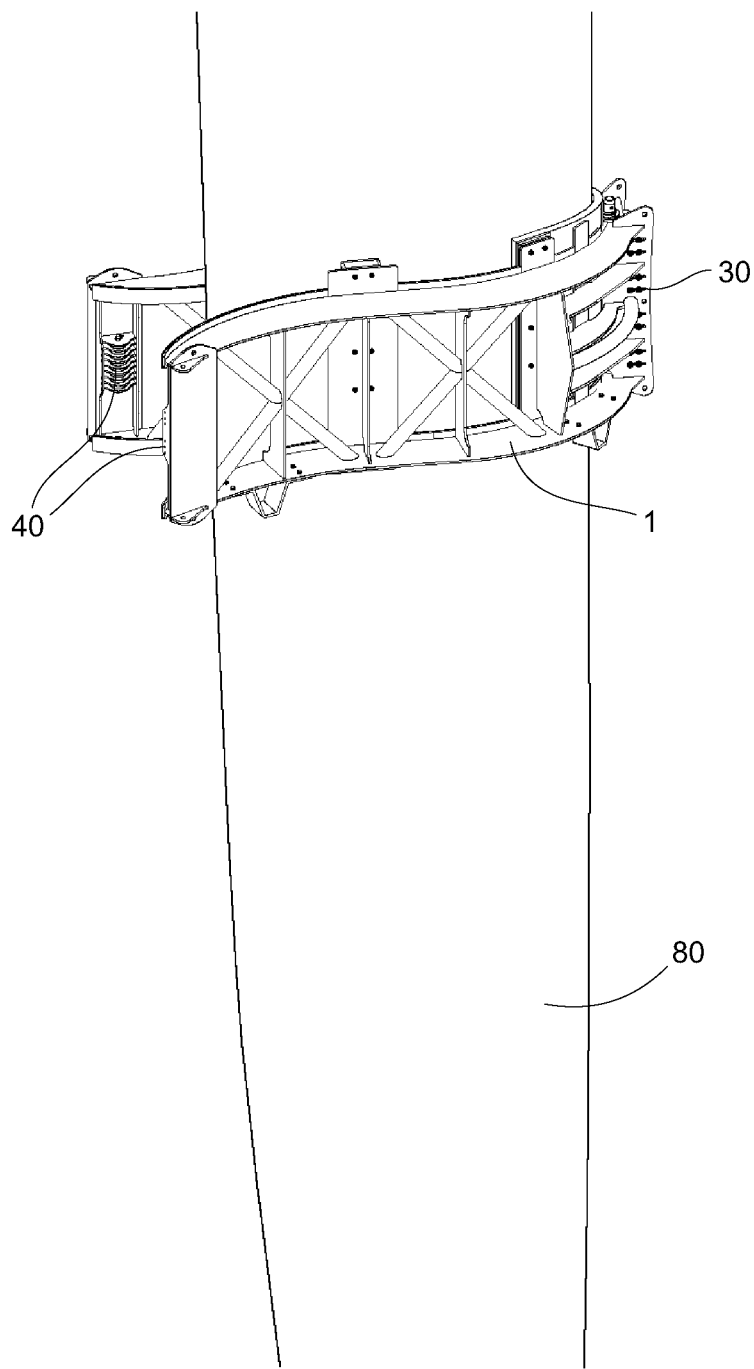
FIG. 20 depicts a perspective view of the rotor blade clamp of FIG. 1 while clamping a rotor blade; and, FIG. 21 depicts a side view of the rotor blade clamp and rotor blade depicted in FIG. 20.
Figure 21:
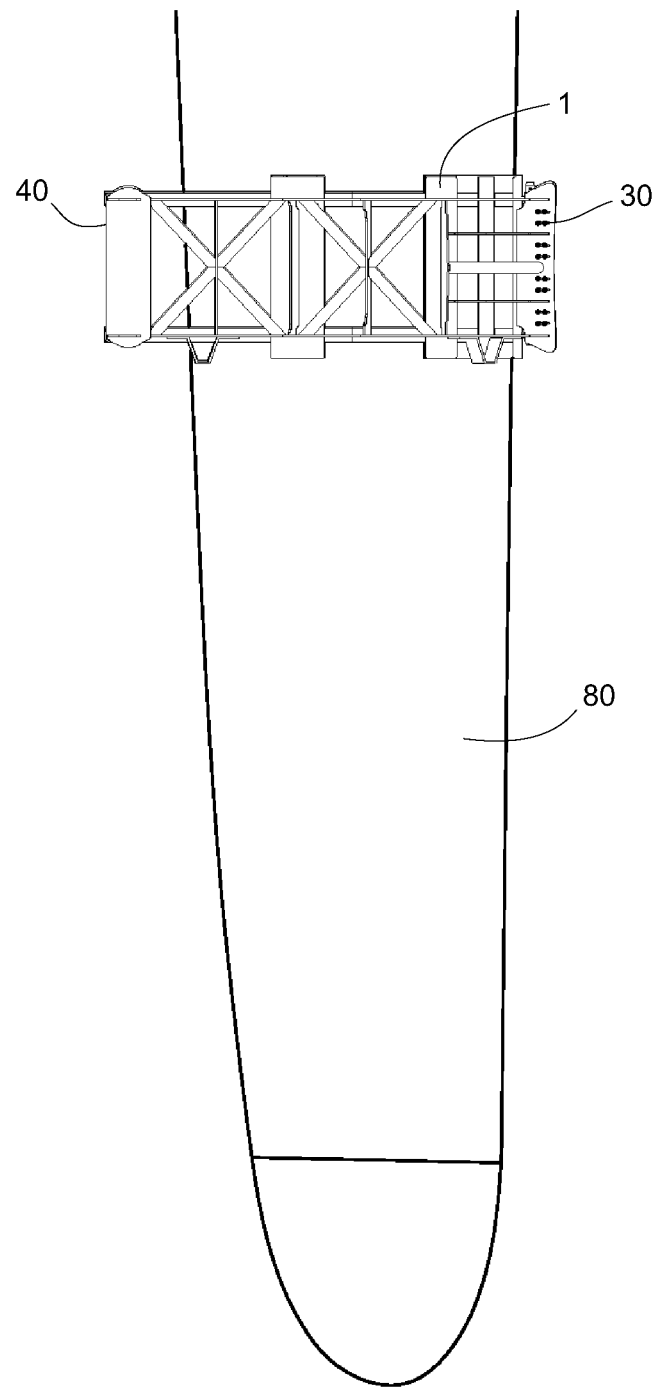

To yet further accommodate the shape of the rotor blade 80, one or more shims (e.g. first and second 5 mm shims 61, 62) may be inserted between the clamping frame 2 and the resilient sliding slab 50. The clamping frame 2 is provided with first and second shim mounts 63, 64 to which the first and second shims 61, 62, respectively, are removably mounted, for example by bolts or other reversible mounting devices. The shims 61, 62 have geometries (size and/or shape) depending on the type of rotor blade being mounted or dismounted from the wind turbine. The shims 61, 62 functionally adjust the size of the "teardrop-shaped" portion of the inner contour of the clamping frame 2, while the resilient sliding slab 50 still separates the clamping frame 2 (including the first and second shims 61, 62) from the rotor blade 80. Shims of any suitable thickness and/or any number of shims may be used, for example from 0 to 10 shims, and the number and/or geometry of shims mounted on the first clamping part may be the same or different than the number and/or geometry of shims mounted on the second clamping part, depending on the type of rotor blade. For example, with reference to FIG. 14 and FIG. 15, the 5 mm second shim 62 as seen in FIG. 14 protrudes less further inwardly than a 35 mm shim 69 as seen in FIG. 15, therefore the 35 mm shim 69 may be used instead of the 5 mm shim 62 when the rotor blade has a slimmer profile at the designated clamping location. The use of interchangeable shims to adapt the blade clamp 1 to many different types of rotor blades is a particularly advantageous feature.

Distally from the shim mounts 63, 64, the inner faces 13, 23 of the first and second clamping parts 10, 20, respectively, have first and second mounting plates 65, 66, respectively mounted thereon. The mounting plates 65, 66 are adapted to permit mounting of first and second resilient buffers 67, 68, respectively. The resilient buffers 67, 68 preferably protrude further inward from the inner faces 13, 23 than does the resilient sliding slab 50 to thereby provide a barrier to the rotor blade 80 to prevent the rotor blade 80 from slipping in the clamp 1 toward the reeving mechanism 40. When the clamp 1 is in the closed configuration, the first and second resilient buffers 67, 68 apply force to the rotor blade 80 to more rigidly hold the rotor blade 80 in the clamp 1. The resilient buffers 67, 68 may be made of a strong but resilient material, for example an elastomer or other rubbery material.

Figure 1:
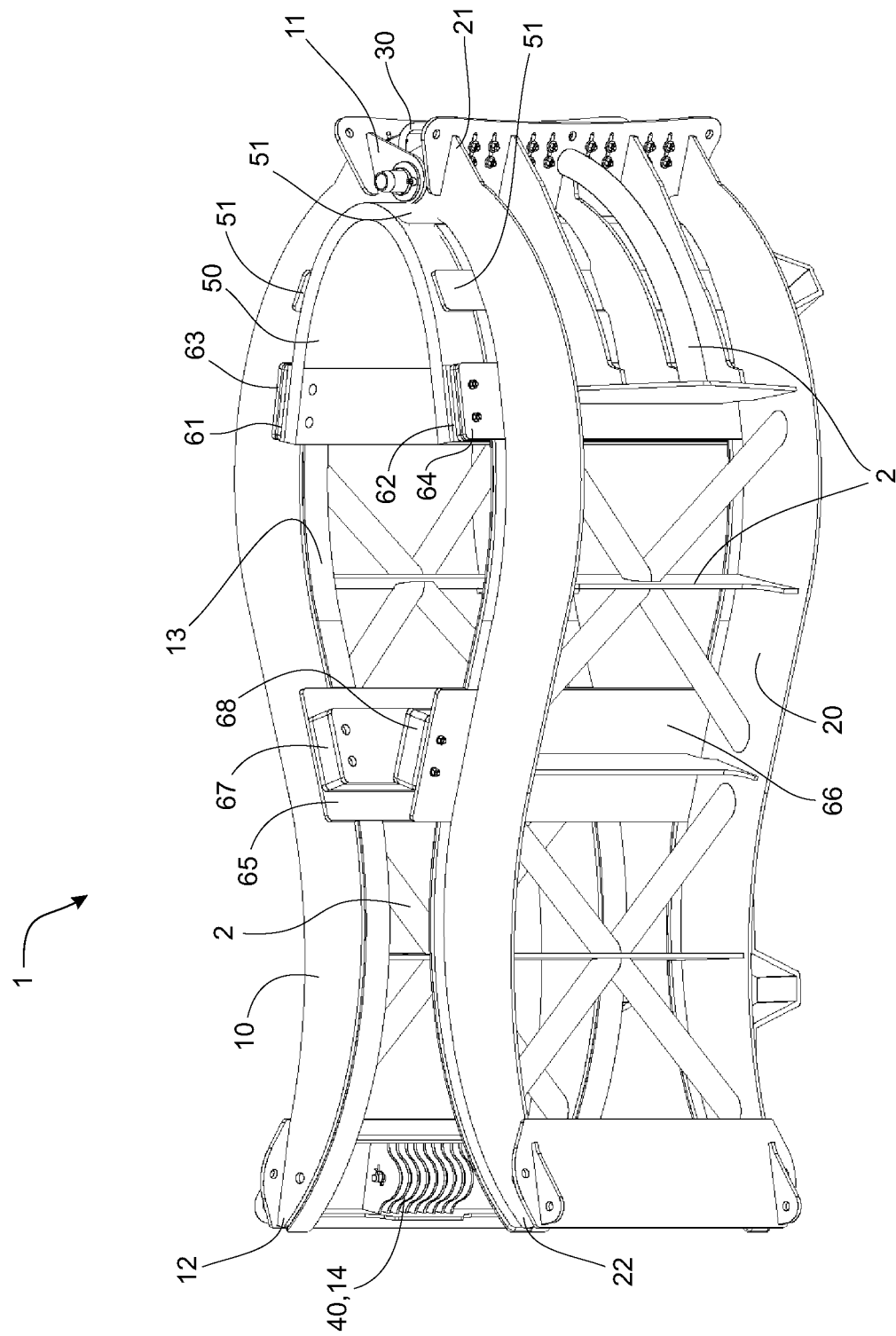
FIG. 1 depicts a perspective view from the top and side of a rotor blade clamp.
Figure 4:
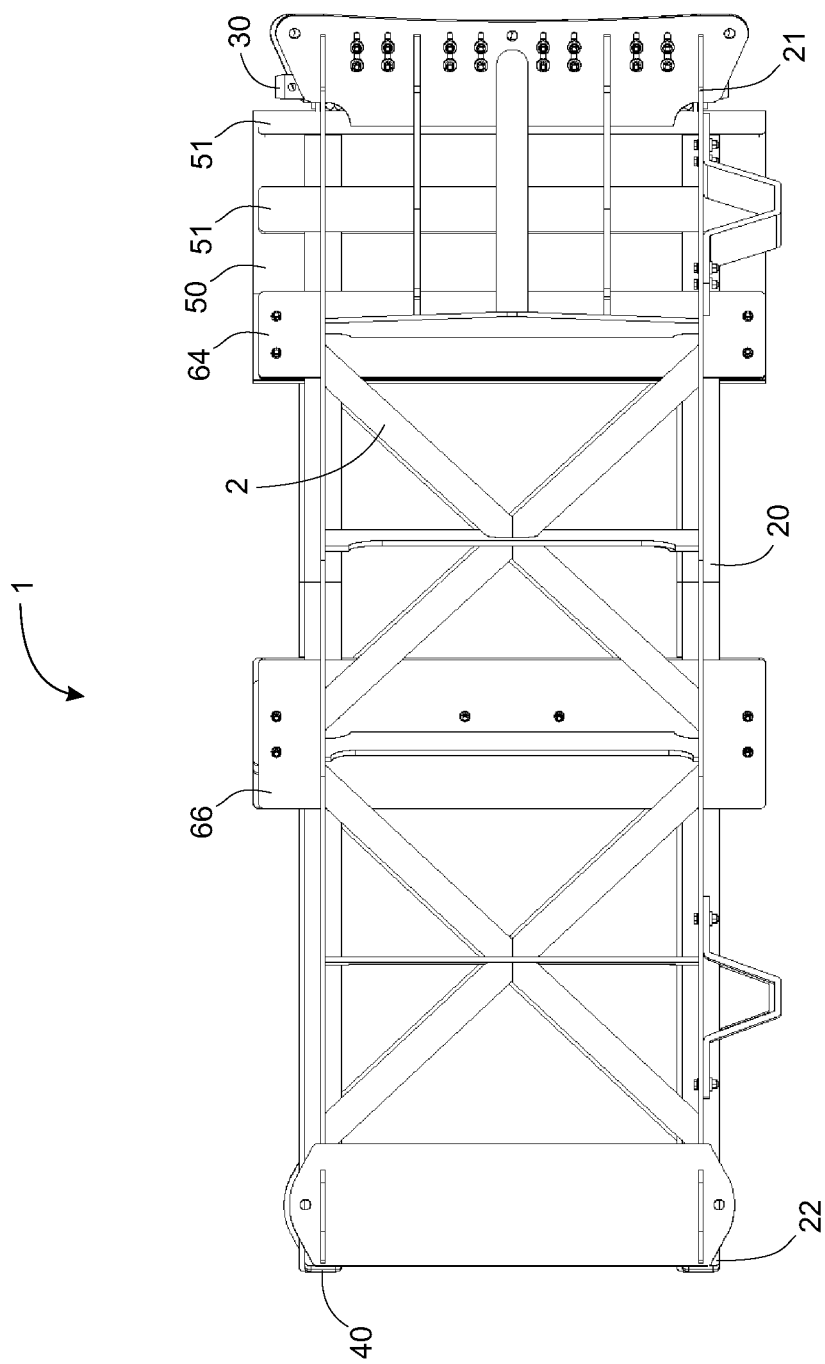
FIG. 4 depicts a side view of the rotor blade clamp of FIG. 1.
Figure 6:
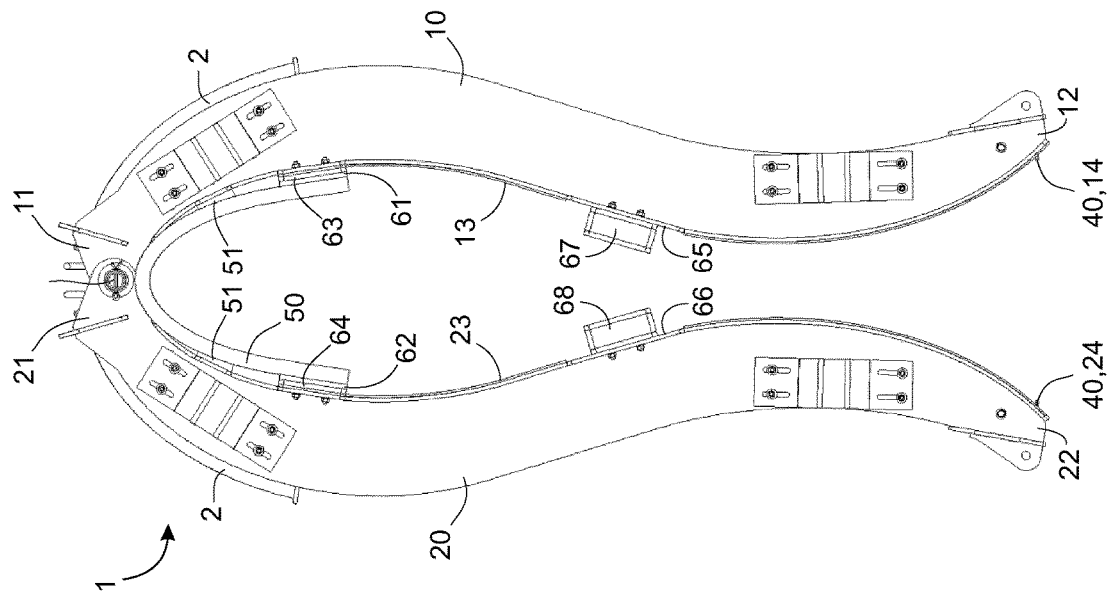
FIG. 6 depicts a bottom view of the rotor blade clamp of FIG. 1.
Figure 5:
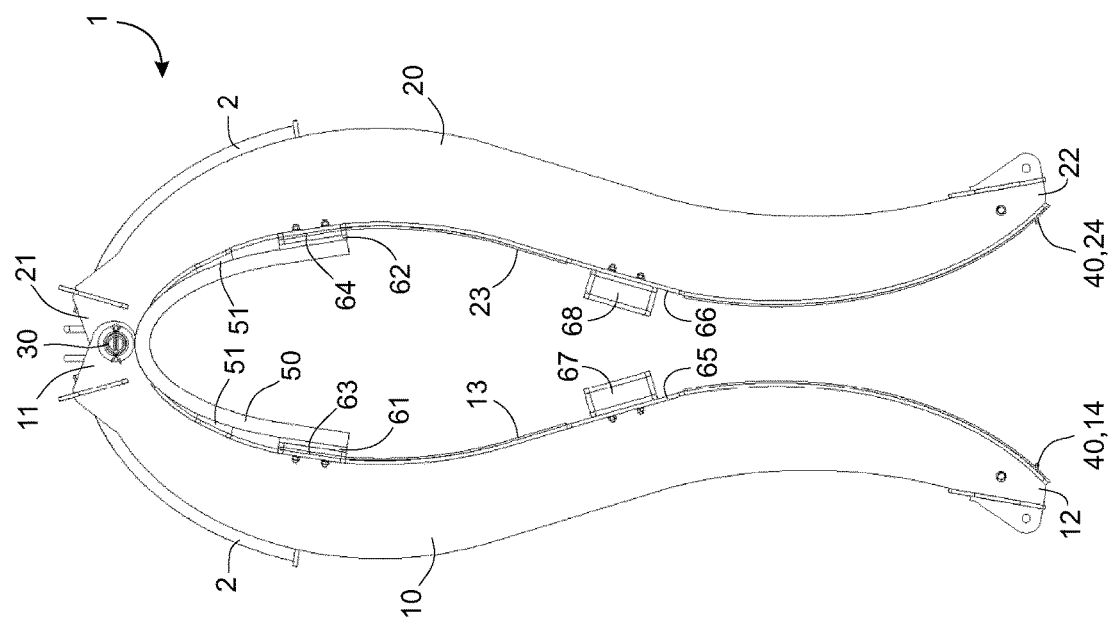
FIG. 5 depicts a top view of the rotor blade clamp of FIG. 1.
Figure 8:
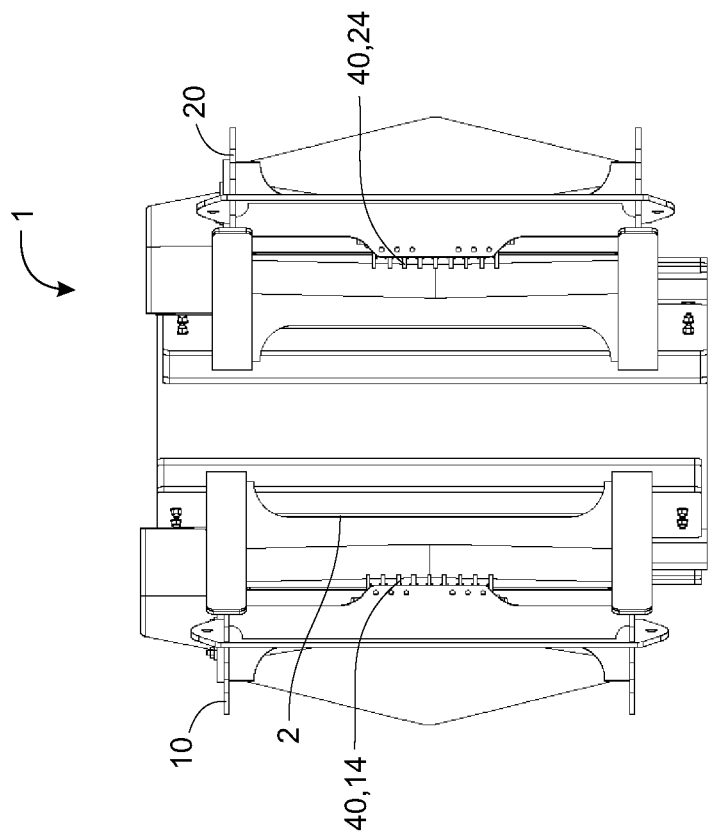
FIG. 8 depicts a rear view of the rotor blade clamp of FIG. 1.
Figure 7:
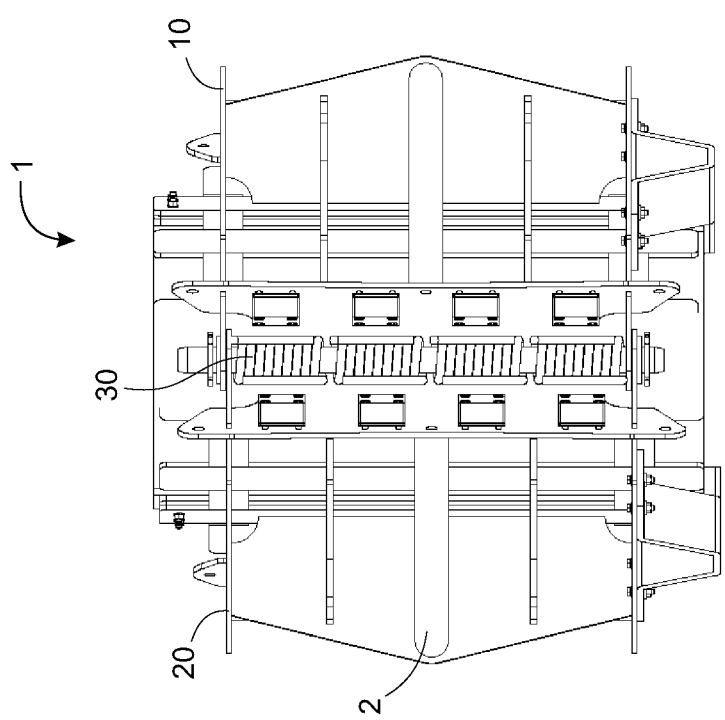
FIG. 7 depicts a front view of the rotor blade clamp of FIG. 1.
Figure 10:
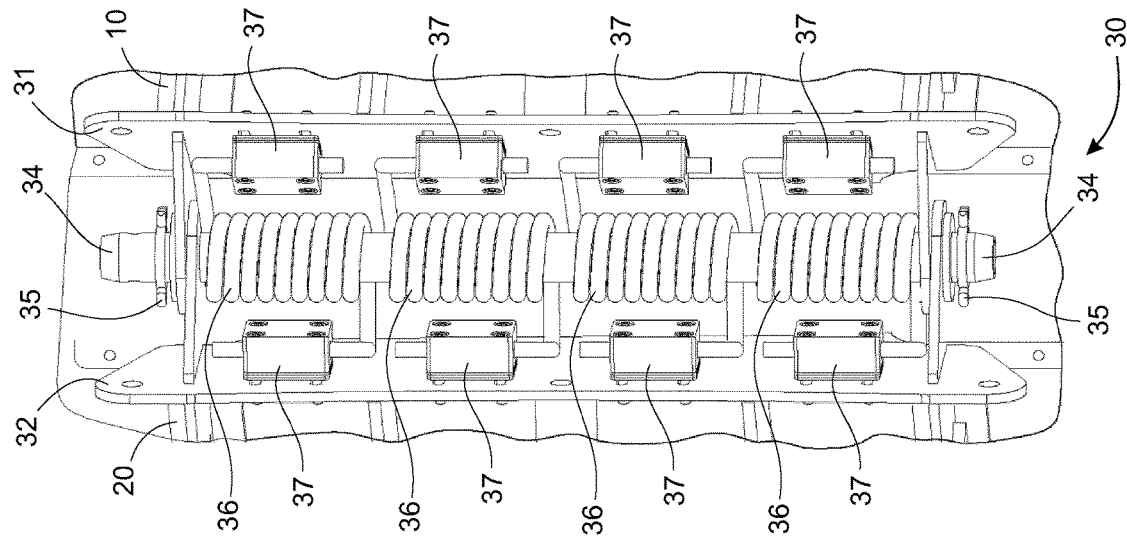
FIG. 10 depicts a magnified side front perspective view of the rotor blade clamp with hinge springs depicted in FIG. 9.
Figure 9:
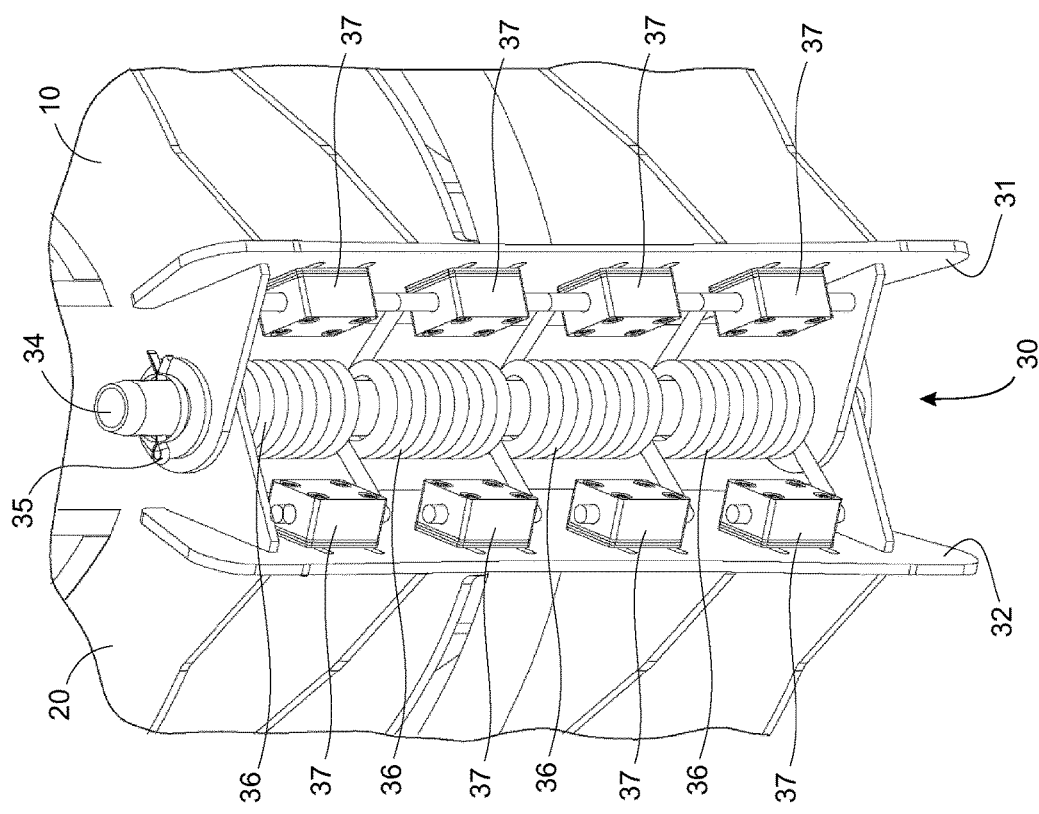
FIG. 9 depicts a magnified top front perspective view of the rotor blade clamp of FIG. 1 showing hinge springs in more detail.

As best seen in FIG. 9 and FIG. 10, the spring-loaded hinge 30 comprises a first hinge plate 31 and a second hinge plate 32 pivotally connected to a common hinge bolt 34, the hinge bolt 34 inserted through the coils of four coiled torsion springs 36, the hinge bolt 34 defining a common rotation axis about which the first and second clamping parts 10, 20 rotate. The first and second clamping parts 10, 20 are mounted on the common hinge pin 34, which is inserted through and extends through aligned apertures in top and bottom frame elements of the first and second clamping parts 10, 20. The hinge pin 34 is secured in the apertures and in the four coiled torsion springs 36 by cotter pins 35. The first and second hinge plates 31, 32 are fixedly attached to the first and second clamping parts 10, 20, respectively, for example by welding or by being integrally formed with the clamping parts. Each of the hinge plates 31, 32 have four connectors 37 fixedly mounted thereto, for example by bolts, each of the connectors 37 having through apertures for receiving a tail of a corresponding coiled torsion spring 36. For each of the four coiled torsion springs 36, there is one corresponding connector 37 on the first hinge plate 31 and one corresponding connector 37 on second hinge plate 32. The four coiled torsion springs 36 are tensioned to bias inner faces of the first and second hinge plates 31, 32, and therefore the inner faces 13, 23 of the first and second clamping parts 10, 20 away from each other toward the open clamp configuration. In this manner, the first and second hinge plates 31, 32 are spring-loaded to rotate the respective first and second clamping parts 10, 20 way from each other about the common rotation axis defined by the hinge bolt 34. While the rotor blade clamp 1 is illustrated with four coiled torsion springs, one or more than one coiled torsion springs may be used. Further, a different type or different types of springs may be used, for example leaf springs.

As best seen in FIG. 11, FIG. 12 and FIG. 13, the reeving mechanism 40 comprises the first reeving portion 14 and the second reeving portion 24 respectively mounted on the first clamping part 10 and the second clamping part 20. The reeving portions 14, 24 are mounted proximate the distal ends 12, 22 of the first and second clamping parts 10, 20, respectively, and face each other transversely along a transverse axis Y between the first and second reeving portions 14, 24 across a central longitudinal axis X of the clamp 1. The reeving line 41 is reeved through the reeving mechanism 40 between first reeving portion 14 and the second reeving portion 24. Pulling on the free portion 42 of the reeving line 41 draws the distal ends 12, 22 of the clamping parts 10, 20 together to a closed clamp configuration against the bias of the hinge 30. The proximal ends 11, 21 of the clamping parts 10, 20, respectively, are pivotally linked together at the hinge bolt 34, so that the clamping parts 10, 20 rotate about the hinge bolt 34 when the distal ends 12, 22 of the clamping parts 10, 20, respectively, are drawn together.

The first reeving portion 14 comprises a first block of pulleys 45 stacked side-to-side along a vertically-oriented axis with respect to the longitudinal and transverse axes X, Y. The second reeving portion 24 comprises a second block of pulleys 46 stacked side-to-side along a vertically-oriented axis with respect to the longitudinal and transverse axes X, Y. The blocks of pulleys 45, 46 are mounted on the inner faces 13, 23 of the respective clamping parts 10, 20. The blocks of pulleys 45, 46 may comprise any suitable number of pulleys to provide sufficient mechanical advantage for an operator pulling on the free portion 42 of the reeving line 41 to be able to overcome torsion forces of the coiled torsion springs 36 of the spring-loaded hinge 30. A dead end 43 of reeving line 41 is fixedly attached to the block of the second block of pulleys 46 at a line mount 44 (e.g. an aperture in the block, an o-ring, a rigging shackle or the like) and the reeving line 41 is threaded back and forth between the pulleys of the blocks of pulleys 45, 46 in a block-and-tackle arrangement. The block-and-tackle arrangement preferably has 3 to 12 reeving parts, for example 7 reeving parts. The free portion 42 of the reeving line 41 extends from the last pulley of the first block of pulleys 45 to a position where a hand grip 49 is within reach of the operator.

A one-way lock comprising a single progress capture pulley 47 is securely mounted on the block of the first block of pulleys 45, for example by using an open swivel linked to a green pin shackle linked to the block. The reeving line 41 is reeved through the single progress capture pulley 47 to prevent movement of the reeving line 41 in the reeving portions 14, 24 to prevent opening of the clamp 1 when the free portion 42 of the reeving line 41 is released by the operator. The dead end of reeving line may be fixedly attached to the block of either of the blocks of pulleys, or to the frame of the clamp on one or the other of the clamping parts. The one-way lock may be mounted on the block of either of the blocks of pulleys, or to the frame of the clamp on one or the other of the clamping parts.

With specific reference to FIG. 16, FIG. 17, FIG. 18 and FIG. 19, in one embodiment of operation, the rotor blade clamp 1 may be rigged with a plurality of rigging lines, a plurality of tag lines and at least one steering line. Any number of rigging lines, any number of tag lines and any number of steering lines may be used depending on the nature of the rotor blade and the requirements of the equipment being used to mount and/or dismount the rotor blade. In some embodiments, only a plurality of tag lines may be used during the lowering and raising operations. The plurality of rigging lines may be used to help seat the rotor blade clamp on the rotor blade, but the plurality of rigging lines and the at least one steering line may not be used to assist with raising or lowering the rotor blade. Instead of the plurality of rigging lines and the at least one steering line, separate rigging installed on the rotor blade may be used to assist with the lowering and raising of the rotor blade once the rotor blade clamp is seated on the rotor blade.

In the embodiment shown in FIG. 16, FIG. 17, FIG. 18 and FIG. 19. the plurality of rigging lines may comprise a three-way rigging arrangement comprising three rigging lines 71 connected to a top of the blade clamp 1 proximate the proximal and distal ends of the clamping parts 10, 20. Proximate the proximal ends of the clamping parts 10, 20, the rigging line 71 is split into two lines 71a, 71b, the line 71a connected to the first clamping part 10 and the line 71b connected to the second clamping part 20. Connection of the rigging lines 71, 71a. 71b to the blade clamp 1 is accomplished through any suitable structure, for example through rigging shackles 76. The three rigging lines 71 are joined into a single hook line 75, which is adapted to be connected to a hook of a lift system (e.g. a crane) (not shown). The lift system is operated to raise or lower the blade clamp 1 when the rigging lines 71 are connected to the blade clamp 1 and the hook line 75, and the hook line 75 is connected to the hook of the lift system. The lift system may be a large ground crane, but is preferably a crane mounted atop a tower 81 of the wind turbine, preferably in a nacelle of the wind turbine.

The plurality of tag lines may comprise two tag lines 72 connected to a bottom of the blade clamp 1 proximate the distal ends of the clamping parts 10, 20. The tag lines 72 are connected to the blade clamp 1 through any suitable structure, for example through rigging shackles 77. The tag lines 72 extend down from the blade clamp 1 to winches (not shown), which pay out or reel in the tag lines 72 during raising or lowering, respectively, of the blade clamp 1 in order to provide stability to the blade clamp 1 and the rotor blade 80 clamped therein during mounting or dismounting of the rotor blade 80.

The at least one steering line may comprise a steering line 73 connected to the blade clamp 1 proximate the proximal end of one of the clamping parts, for example the second clamping part 20. The steering line 73 is connected to the blade clamp 1 through any suitable structure, for example through a carabiner 78 clipped to a frame element 2a of the second clamping part 20. The steering line 73 extends down within reach of ground personnel or a ground crane to manipulate the steering line 73 to properly orient the rotor blade 80 during mounting or dismounting of the rotor blade 80.

In one embodiment of the method, the rotor blade 80 may be dismounted from a rotor of the wind turbine by the following procedure. To mounting the rotor blade 80 on the hub of the wind turbine, the reverse of the following procedure may be utilized.

A. Hoist a turbine-mountable lift system of sufficient capacity to lift the rotor blade 80 up to the nacelle of the wind turbine and mounted thereon. One such lift system is disclosed in Canadian Patent Application CA 3,016,141 filed Aug. 31, 2018, the entire contents of which is herein incorporated by reference.

B. Properly shim the blade clamp 1 for the type of rotor blade 80 by installing the shims 61, 62 between the shim mounts 63, 64 and the sliding slab 50.

C. Position the rotor blade 80 to a position' such that a tip of the rotor blade 80, an installation position of the clamp 1 on the ground and a position of the hook of the lift system are aligned. The position is usually between the '5 o'clock' and '7 o'clock' positions, for example the '6 o'clock' position.

D. After the rotor blade 80 is positioned, use the turning gear on the highspeed side of the gearbox to lock out the brake so that personnel can safely stand on the hub.

E. Install the hook line 75, with the rigging lines 71 attached thereto, on the hook of the lift system with the rigging lines 71 hanging to the ground. Then install the rigging lines 71, tag lines 72 and steering line 73 on the blade clamp 1. The tag lines 72, the steering line 73 and the reeving line 41 should be free to hang below the blade clamp 1 to be reached by the ground personnel throughout the entire procedure.

F. Pretension the reeving mechanism 40 of the blade clamp 1 until a distance between the distal ends 12, 22 of the clamping parts 10, 20 is a desired amount depending on the type of rotor blade 80.

G. Adjust the rigging lines 71 attached to the distal ends 12, 22 of the clamping parts 10, 20 to obtain a desired rigging geometry depending on the type of rotor blade 80.

H. Lift the blade clamp 1 with the lift system to the tip of the rotor blade 80 while maintaining proper orientation using the tag lines 72.

I. Position the blade clamp 1 to freely slide over the tip of the rotor blade 80, and then lift the blade clamp 1 with the lift system to a position about 2-3 m above the tip of the rotor blade 80 to gently rest on a leading edge of the rotor blade 80.

J. After the blade clamp 1 is resting gently on the leading edge of the rotor blade 80, lift the blade clamp 1 with the lift system to the designated clamping location on the rotor blade 80.

K. Close the blade clamp 1 around the rotor blade 80 by pulling on the free portion 42 of the reeving line 41.

L. Disconnect the rotor blade 80 from the rotor hub.

M. Lower the rotor blade 80 with the lift system using the tag lines 72 and the steering line 73 to guide the rotor blade 80 to a desired location. The tag lines 72 are primarily used for lateral stability. The steering line 73 is primarily used to pull the blade clamp 1 away from the tower 81.

The rotor blade 80 may be lowered to the ground or to a bed of a transport vehicle. Alternatively, the rotor blade 80 may be lowered to a height sufficiently lower than the rotor blade's original height to permit maintenance or replacement of rotor blade parts, in cases where there is no requirement to lower the rotor blade 80 all the way to the ground. In some embodiments, the rigging lines may be replaced or supplemented with other rigging elements once the blade clamp 1 has been closed at the designated clamping location. When removal of the blade clamp 1 is desired, the following further steps may be undertaken.

N. Open the blade clamp 1 by disengaging the one-way lock.

O. Slide the blade clamp 1 from the rotor blade 80 (using the lift system to lower the blade clamp 1 and using the tag lines 72 and steering line 73 to keep the clamp aligned properly, if necessary).

P. Lower the clamp 1 to the ground using the lift system, if necessary.

Q. Remove the rigging lines 71, tag lines 72 and steering line 73 from the blade clamp 1.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A rotor blade clamp for assisting with mounting and/or dismounting of a rotor blade on a rotor hub of a wind turbine, the rotor blade clamp comprising:
 a first clamping part having a first inner face contoured to accommodate a shape of the rotor blade at a designated clamping location on the rotor blade;
 a second clamping part opposed to the first clamping part, the second clamping part having a second inner face opposed to the first inner face and contoured to accommodate the shape of the rotor blade at the designated clamping location on the rotor blade;

a spring-loaded hinge connecting the first clamping part to the second clamping part, the spring-loaded hinge comprising at least one spring that biases the clamping parts apart to an opened clamp configuration;

a reeving mechanism comprising a first reeving portion on the first clamping part and a second reeving portion on the second clamping part, the first and second reeving portions adapted to receive a line therebetween, whereby pulling a free portion of the line reeved through the reeving portions draws the clamping parts together to a closed clamp configuration against the bias of the at least one spring, wherein the first reeving portion comprises a first block of pulley elements and the second reeving portion comprises a second block of pulley elements and the blocks of pulley elements are mounted on the inner faces of respective clamping parts of the first clamping part and the second clamping part.

2. The clamp of claim 1, wherein the first clamping part comprises a first shim mount for removably mounting a first shim on the first inner face of the first clamping part, the first shim having a first geometry depending on a type of the rotor blade being mounted or dismounted.

3. The clamp of claim 2, wherein the second clamping part comprises a second shim mount for removably mounting a second shim on the second inner face of the second clamping part, the second shim having a second geometry depending on the type of the rotor blade being mounted or dismounted.

4. The clamp of claim 1, wherein the hinge connects a proximal end of the first clamping part to a proximal end of the second clamping part, and provides a common rotation axis about which the clamping parts rotate when the spring biases the clamping parts to open or when the pulling of the line causes the clamp to close.

5. The clamp of claim 1, wherein the at least one spring is at least one coiled torsion spring and the hinge further comprises a hinge pin disposed within the coil of the at least one coiled torsion spring.

6. The clamp of claim 5, wherein the at least one coiled torsion spring is a plurality of coiled torsion springs and the hinge pin is disposed within the coils of all of the coiled torsion springs.

7. The clamp of claim 1, wherein the first reeving portion is situated proximate a distal end of the first clamping part and the second reeving portion is situated proximate a distal end of the second clamping part.

8. The clamp of claim 1, wherein the reeving mechanism comprises a one-way lock for preventing movement of the line in the reeving portions to prevent opening of the clamp.

9. The clamp of claim 8, wherein the one-way lock comprises a single progress capture pulley through which the line is reeved.

10. A method of mounting or dismounting of a rotor blade of a wind turbine, the method comprising:

providing the rotor blade clamp as defined in claim 1;

installing rigging on the clamp and suspending the clamp from a top of the wind turbine at a position where the clamp can receive the rotor blade between the clamping parts of the clamp;

pre-tensioning the reeving mechanism with the line reeved therethrough until a distance between distal ends of the clamping parts is a predetermined distance based on geometry of the rotor blade;

moving the clamp over a tip of the rotor blade so that the tip of the rotor blade is between the clamping parts of the clamp, and further moving the clamp along the rotor blade with the rotor blade between the clamping parts until the clamp reaches the designated clamping location;

operating the reeving mechanism to close the clamp on the rotor blade at the designated clamping location to secure the rotor blade in the clamp; and, raising or lowering the rotor blade using the rigging installed on the clamp or separate rigging installed on the rotor blade.

11. The method of claim 10, further comprising installing at least one shim on the inner face of at least one of the clamping parts of the clamp, the at least one shim having a geometry depending on a type of the rotor blade being mounted or dismounted.

* * * * *